Nov. 17, 1931.  F. T. BROWN  1,832,527
AUTOMATIC FREE WHEELING CLUTCH
Filed Feb. 24, 1931  3 Sheets-Sheet 2
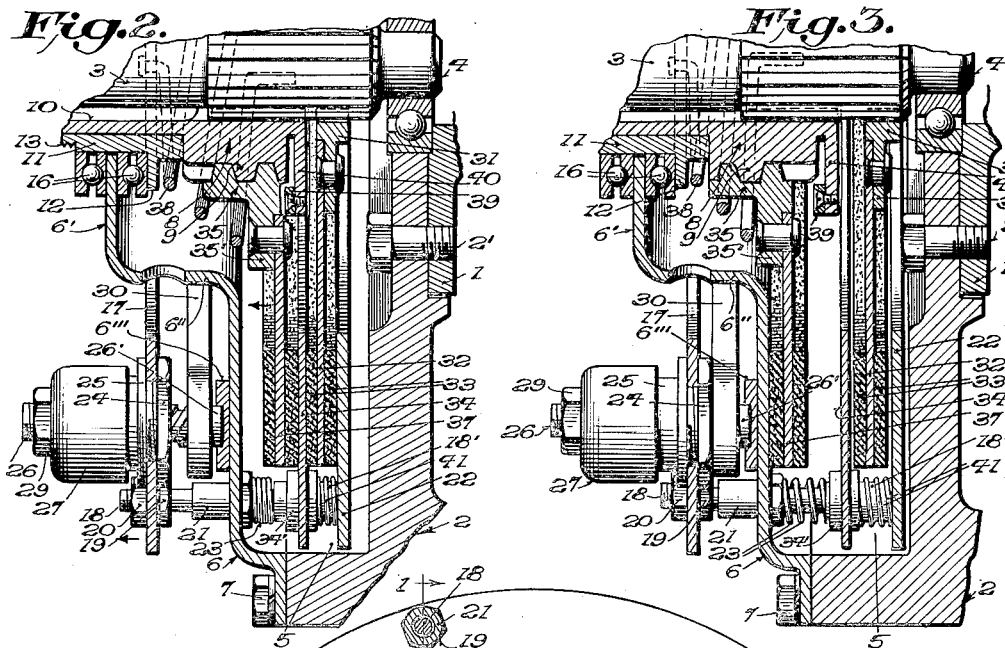
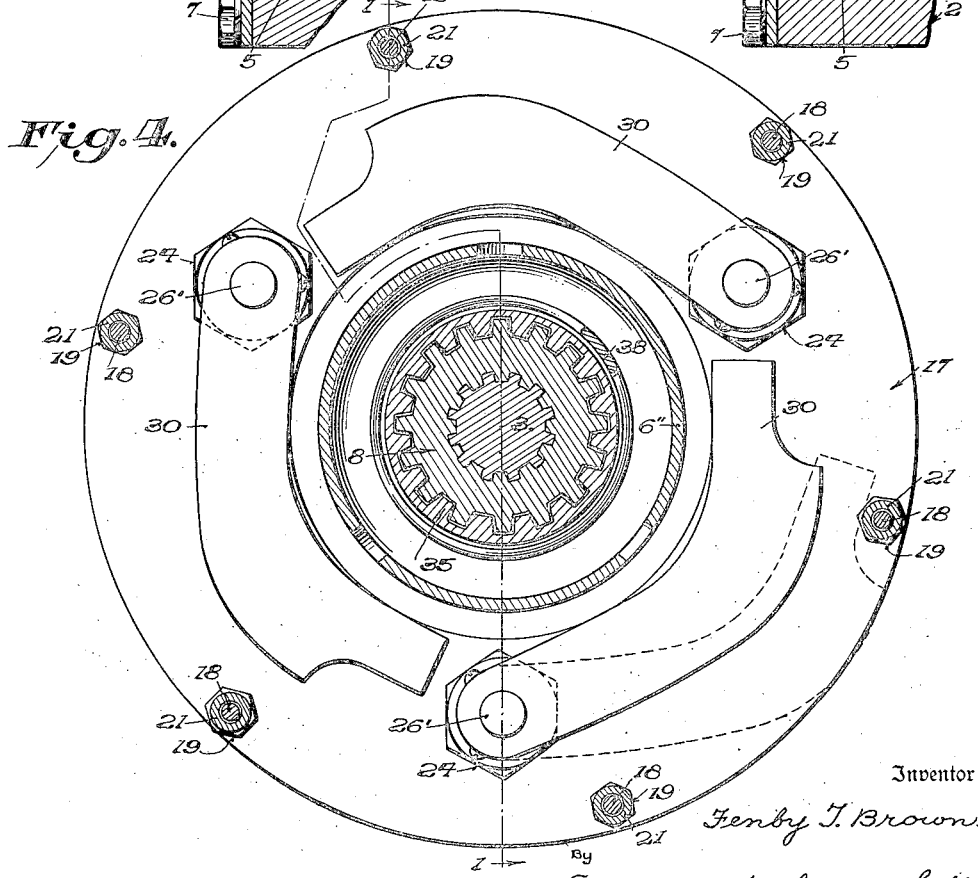
Inventor
Fenby T. Brown.
By Cameron, Kerkam & Sutton
Attorneys

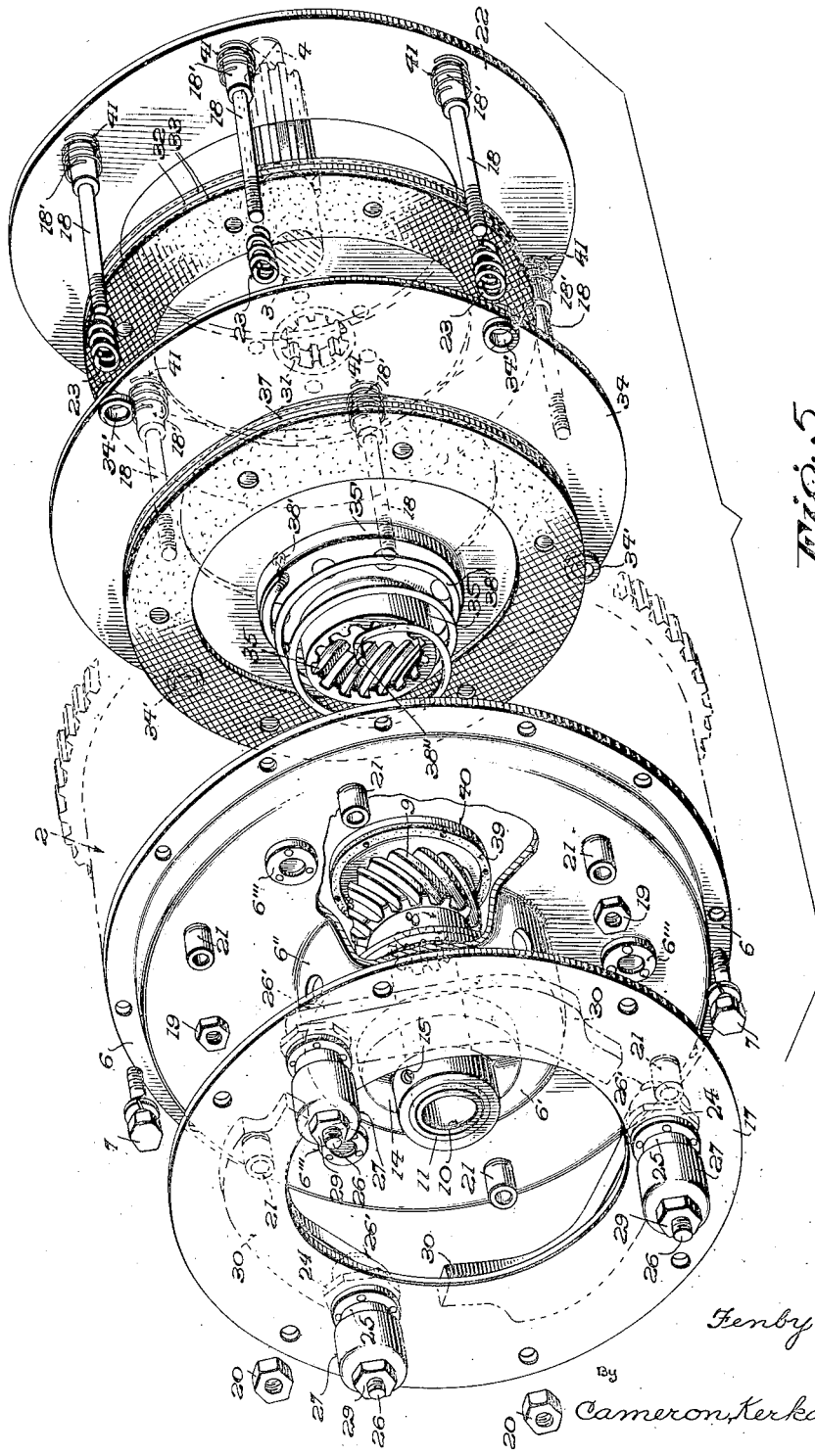

Patented Nov. 17, 1931

1,832,527

UNITED STATES PATENT OFFICE

FENBY T. BROWN, OF BALTIMORE, MARYLAND, ASSIGNOR TO INVESTORS INDUSTRIES, INC., OF BALTIMORE, MARYLAND, A CORPORATION OF MARYLAND

AUTOMATIC FREE-WHEELING CLUTCH

Application filed February 24, 1931. Serial No. 518,003.

This invention relates to automatic, freewheeling clutches for motor-driven vehicles, and has for its object to provide a clutch of this type which shall be capable of operation without the necessity of using a clutch pedal or the necessity for shifting gears, except for reverse or special performance; which, if desired, may be smoothly started with the parts in high gear without applying excessive strains on the part of the driving mechanism of the automobile; and one by whose operation it shall be impossible to stall the motor.

A further object is to provide an automatic, free-wheeling clutch having the above characteristics and capable of automatically connecting the motor with the driven shaft to act as a brake, and which may be installed as a unit and as a substitute for the prevailing clutches employed in the great majority of automobiles now in use, without the necessity of machining of any parts, and by any ordinarily skilled automobile mechanic. A still further object is to provide a clutch of this type of simple and rugged construction, and which can be manufactured at a minimum cost.

With these and other objects in view, the invention consists in the construction and combination of parts hereinafter more specifically described.

The inventive idea involved is capable of being embodied in a variety of mechanical constructions, one of which, for the purpose of illustrating the invention, is shown in the accompanying drawings, but it is to be expressly understood that such drawings are for the purpose of illustration only and are not designed to define the limits of the invention, reference being had to the appended claims for this purpose.

In said drawings:

Fig. 2 is a broken sectional view on the same line as the lower half of Fig. 1, and showing the parts in normal driving position, that is, when the automobile is driven by the motor;

Fig. 3 is a view similar to Fig. 2, but illustrating the operation of the parts when the motor is acting as a brake;

Fig. 4 is a section on the line 4—4 of Fig. 1 looking in the direction of the arrows, and Fig. 5 is an expanded view, showing parts of the clutch separated, or drawn apart, to more clearly illustrate the construction.

Figure 1:
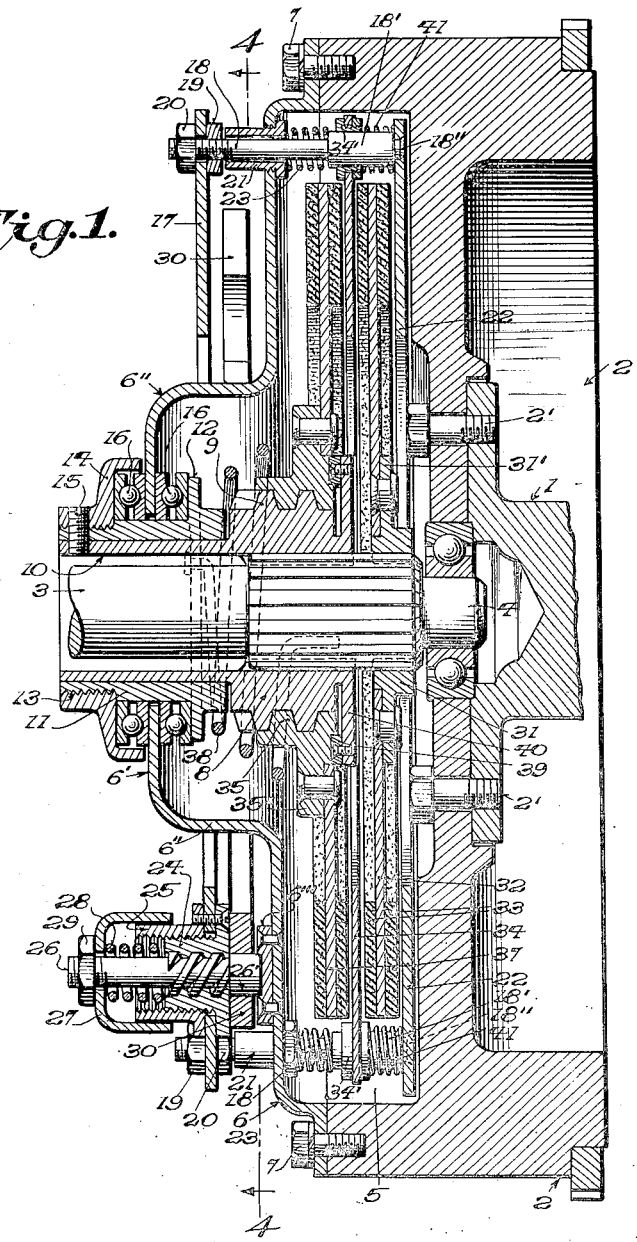
Fig. 1 is a sectional view taken on staggered line 1, 1, Fig. 4 and shows the parts in substantially the position which they occupy when the engine is standing still, or merely idling, as well as during free-wheeling.

The spacing of the several clutch disks is somewhat magnified for clearness of illustration.

Referring to the drawings, in which like reference numerals indicate like parts throughout the several views, 1 indicates the driving shaft or motor driven shaft of an automobile and 2 the flywheel bolted or otherwise secured to said shaft and driven thereby, the driven shaft 3 being reduced at its forward end 4, where it takes bearing in the flywheel. As is usual, the rear portion of the flywheel is hollowed out or cup-shaped, as indicated at 5, and is provided with a cover plate 6 firmly secured to the rear rim of the flywheel, as by bolts 7. Splined to the forward end of the driven shaft 3 is a sleeve 8, which sleeve at its forward portion is provided with a screw thread 9, and at its rearward portion is reduced, as shown at 10, the reduced portion 10 being surrounded by a sleeve 11, which sleeve has an annular flange 12, and at its extreme rear portion 13 is screw threaded and has a cup-shaped nut 14 threaded thereon and locked in position in any suitable way, as by screw 15. Between the annular flange 12 and the cup-shaped nut 14 are placed antifrictional bearings 16, 16, between which is received the interior rim 6' of the dome-shaped portion 6" of the cover 6. An annular disk 17 surrounds the dome-shaped cover portion 6" of the cover 6, and a plurality of rods 18 are secured to the disk 17 as between nuts 19 and 20 engaging the screw threaded rods 18 on opposite sides of the disk 17. Screw threaded into suitable openings in the cover 6 are sleeves 21 whose interior diameters are slightly greater than that of the exterior diameter of the rods 18, said sleeves projecting outward some distance from the cover 6, and being provided on their interior ends with a flange, as shown. The forward portions of said rods 18 are enlarged, as shown at 18', and at their extreme forward ends 18" said rods are secured to an annular disk 22 constituting the forward clamping plate of the clutch. Between the enlargement 18' of each pin 18 and the flange of the sleeve 21 is a spring 23 reacting between said flange and said enlargement 18', and tending to force the clamping plate 22 into the position shown in Fig. 1. It will be understood that there is a plurality of pins 18 and the other parts just described as associated therewith and that said pins are uniformly distributed around the clutch structure (see Fig. 5).

Mounted upon and rigidly secured to the disk 17 is a plurality (here shown as 3) of nuts 24, each of which is preferably clamped in an opening in the disk 17 between a flange on the nut and a sleeve 25 screw threaded to the exterior portion of the nut 24.

Screw threaded in the nut 24 is a rod 26 having a cap 27 sliding thereon, and between said cap and the rear end of the nut 24 is a spring 28, said cap being retained in position by a nut 29 screw threaded onto the rear end of the rod 26 to the end that the tension of the spring 28 may be adjusted. The forward end 26' of the rod 26 abuts against the forward face of the cover 6 preferably through the medium of an interposed block 6'''. Between the nut 24 and the block 6''' a weighted lever 30 is keyed to the enlarged end 26' of the rod 26. As shown, there are three of these weighted levers mounted as just described (see Fig. 4), and under the action of centrifugal force these levers are thrown outward from the full line to the dotted line position shown in Fig. 4, and in so doing they turn the screw threaded rods 26 and move the nuts 24 and with them the disks 17 and 22 rearward, that is, from right to left, as viewed in Fig. 1, against the tension of the springs 23. The sleeves 21 act as stops limiting the outward movement of the levers 30.

Splined to slide on the forward end portion of the shaft 3 is a sleeve 31 provided with an annular flange 31', and to this flange there is riveted, or otherwise rigidly secured, an annular disk 32, which disk is preferably provided on its opposite sides with frictional surfacing material 33.

An annular disk 34 is provided with openings 34', which openings are preferably sleeved, as clearly shown in Fig. 5, and through these openings the pins 34 extend, the sleeves of such openings surrounding the enlarged portions 18' of the pins 18 (Fig. 1). This disk 34 is positioned just rearward (to the left in Fig. 1) of the disk 32.

Mounted on the screw threaded portion 9 of the sleeve 8 is a nut 35 provided with an annular flange 35' to which is rigidly secured by rivets, or otherwise, an annular disk 37, which disk 37 is also preferably provided with frictional surfaces corresponding to the frictional surfaces 33 of the disk 32.

A stiff coil spring 38 has one end 38' (Fig. 5) anchored in the flange 35' of the nut 35 and its other end 38" anchored in the flange 12 of the sleeve 11. In case of relative movement between the screw sleeve 8 and the nut 35 the nut can be moved rearward (from the position shown in Fig. 1) on the screw sleeve, but against the tension of the spring 38, the tendency of the spring 38 being always to return the nut to the position shown in Fig. 1, in which position the nut 35 abuts against a stop 39, carried on an annular flange 40, rigidly secured to the forward end of the screw sleeve 8.

If desired, light springs 41 may surround the forward end portions 18' of the pins 18, and react between the forward clamping disk 22 and the disk 34. Such springs are not essential, but in some cases may be found desirable.

*Operation.*—Before the engine is started the parts occupy substantially the position shown in Fig. 1, and this is also substantially the position which they occupy during idling of the engine, that is, with the engine running at a speed lower than the predetermined speed at which it is desired that the clutch shall function to start the vehicle. When, however, the engine reaches the predetermined speed, centrifugal weights 30 move outward, and in so doing turn the pins 26, which in turn act to move the nuts 24 rearward, or to the left as shown in Fig. 1, carrying with them the disk 17, the pins 18 and the clamping disk 22. During this movement said clamping disk comes in contact with the friction surface on the disk 32 and moves it into contact with the disk 34. The initial contact of the clamping disk 22 with the disk 32 tends to give a slight turning movement to the shaft 3 and with it the screw sleeve 8, which turning movement moves the nut 35 slightly rearward from the position shown in Fig. 1 to the position shown in Fig. 2. This rearward movement of the nut 35, however, takes place against resistance of the spring 38. As the clamping disk 22 continues to move rearward, it forces the disk 34 into contact with the frictional face of the disk 37. When the vehicle gets under way and the revolutions of the shaft 3 coincide with revolutions of the shaft 1, the spring 38 has a tendency to turn the nut 35 so as to move the disk 37 forward towards its position shown in Fig. 1. The higher the speed of the engine, the greater will be this tendency, thus securing a firmer frictional contact between the driving and the driven disks of the clutch, and the parts will be in substantially the position shown in Fig. 2, though it will be understood that the exact position of the parts, and particularly the spacing of the disks as shown in Fig. 1, is somewhat exaggerated for purposes of illustration.

*Free-wheeling.*—When the speed of the engine is so controlled by the driver through the accelerator that the speed of the shaft 1 becomes less than the speed of the shaft 3, due to momentum, that is, when the shaft 3 overruns the shaft 1, the screw sleeve 8 is revolved in the direction to move the nut 35 and the disk 37, secured thereto, to the left of the position shown in Fig. 2 and against the tension of the spring 38, thus releasing the frictional engagement of the clutch disks. By reason of the slowing down of the speed of the shaft 1 below that of the predetermined speed for starting the vehicle, the centrifugal weights 30, under the influence of the springs 23 and 28, will be returned to their normal or full line position shown in Fig. 4, and the parts of the clutch will return to substantially the position shown in Fig. 1 with the screw disk 34 in its forward position against the stop 39 on the flange 40. With the parts in this position, as long as the speed of the shaft 3 exceeds the speed of the shaft 1, free-wheeling will occur. It will be noted that in free-wheeling the screw actuated disk 37 travels a predetermined distance rearwardly on the screw sleeve 8 and then reverses itself and moves forward, that is, from left to right in Fig. 1, against the stop 39. It will be understood that in order to effect this free-wheeling action the operator removes his foot entirely from the accelerator.

*Motor acting as a brake.*—With the vehicle in motion (free-wheeling), and regardless of the ground speed at which it is moving, to use the motor as a brake the operator presses on the accelerator to speed up the engine just above idling speed. This moves the parts from the position shown in Fig. 1 to that shown in Fig. 2, but as the screw disk 37 is moving and moving faster than disk 34, the contact between the two tends to momentarily check disk 37, without checking the revolution of screw 8, and the nut 35, and with it the disk 37, are moved rearward, bringing the disk 37 into frictional contact with the inner face of cover 6 of the clutch (see Fig. 3). In this position the revolutions of the shaft 3 are opposed by the compression in the motor, thereby effecting a braking action through the motor. The parts will remain in the position shown in Fig. 3 until the motor is accelerated by the operator to R. P. M. greater than the speed of the driven shaft 3. When this occurs the screw disk 37, together with the nut 35 carrying the same, will move forward (from left to right as shown in the drawings) on the screw sleeve 8, until said disk contacts with the forward stop 39, as shown in Fig. 1, this action of the screw disk being assisted by the coil spring 38.

This braking action may be employed to bring the vehicle to rest in place of the emergency brake in the event that the brake is worn and will not hold the vehicle, but this can only be effected when coming to a stop with the engine running and the screw actuated disk 37 already in its braking position shown in Fig. 3.

What is claimed is:

1. In a clutch, the combination of a motor driven rearwardly facing cup-shaped flywheel, a driven shaft taking bearings in said flywheel axially thereof, a cover fixed to said flywheel and having antifrictional bearing around said shaft, an annular plate exterior to said cover, centrifugally actuated means mounted on said cover and imparting movement to said plate axially of said shaft, clutch disks within said cup-shaped flywheel and secured respectively to said shaft and flywheel, and means actuated by the movements of said exterior plate to engage and disengage said clutch disks.

2. In a clutch, the combination of a driving shaft and a driven shaft in longitudinal alinement, with a clutch disk splined to the driven shaft and longitudinally movable thereon, a nut screw-threaded on said shaft, a second clutch disk carried by said nut, a spring tending to impart turning movement to said nut relative to the shaft, a third clutch disk carried by said driving shaft between said first and second disks and capable of movement longitudinally of said driving shaft, a clamping disk also carried by said driving shaft, and centrifugal means moving said clamping disk to force all of said disks into clamping engagement.

3. In a clutch, the combination of a driving shaft, a driven shaft, a driving clutch member, and a driven clutch member, with means automatically engaging said members, means automatically disengaging said members when the speed of the driven shaft exceeds that of the driving shaft, and means operable on accelerating the speed of the driving shaft but below that of said driven shaft during said disengagement and connecting the driven shaft to the driving shaft.

4. In a clutch, the combination of a motor-driven flywheel and a driven shaft, with means carried respectively by said flywheel and said shaft for automatically connecting the same when the flywheel exceeds a predetermined speed and disconnecting said flywheel and shaft when the speed of the shaft exceeds that of the flywheel, and means operable by accelerating the speed of the flywheel, but below that of the said shaft, for connecting the flywheel and shaft.

5. In a clutch, the combination of a motor-driven flywheel, a driven shaft taking bearing axially therein, and a friction disk screw-threaded on said shaft and capable of frictional engagement with a part fixed on said flywheel when the speed of revolution of the driven shaft exceeds that of the flywheel, whereby the revolutions of said shaft are resisted by the motor.

6. In a clutch, the combination of a motor-driven flywheel, a driven shaft taking bearing axially therein, a friction disk screw-threaded on said shaft and capable of frictional engagement with a part fixed on said flywheel when the speed of revolution of the driven shaft exceeds that of the flywheel, whereby the revolutions of said shaft are resisted by the motor, and a spring reacting spirally and helically against said disk.

7. The combination of a motor-driven cup-shaped flywheel, a cover secured to the rim thereof, a driven shaft passing through said cover and taking bearing axially in the flywheel, a clutch disk splined on said shaft within the flywheel, a second clutch disk screw-threaded on said shaft, an annular plate exterior to the cover and surrounding said shaft and having a plurality of cam faces fixed thereon, a plurality of pins each bearing at one end against said cover and each having a cam surface engaging one of the cam faces on said annular plate, centrifugal weights secured to said pins and imparting circumferential movement thereto, a driven disk within the flywheel and between the said clutch disks on said shaft, a clamping plate within the flywheel, and means connecting said annular plate and said clamping plate, whereby said clutch disks and driven disk are clamped together.

8. In a clutch, the combination of a driving and a driven shaft, a driving clutch member and a driven clutch member normally disengaged below a predetermined speed of the driving shaft, automatic means engaging said clutch members when the driving shaft reaches the predetermined speed, means operable by the driven shaft and automatically disengaging said clutch members when the speed of the driven shaft exceeds that of the driving shaft, and means operable by the driven shaft and connecting said shafts when the driving shaft is accelerated during said disengagement.

9. In a clutch, the combination of a driving shaft and a driven shaft in alinement, a screw thread on said driven shaft, a nut threaded thereon, a stop on said shaft against which said nut is normally held, a disk carried by said nut, a clutch disk slidably mounted on the driven shaft, a clutch disk carried by said driving shaft and slidable longitudinally thereof between said disks on the driven shaft, and an automatically operated clamping plate for forcing said disks into engagement.

10. In a clutch, the combination of a driving shaft, and a driven shaft having a screw thread thereon, a clutch disk threaded on said driven shaft, a clutch disk slidable axially on the driven shaft, a clutch disk carried by and slidable axially of the driving shaft, and a clamping plate carried by the driving shaft and between which and the screw-threaded disk said slidable disks are automatically clamped when the driving shaft exceeds a predetermined speed.

11. In a clutch, the combination of a driving shaft, a clutch member carried thereby, a driven shaft, a clutch member screw-threaded thereon, automatic means forcing said members into clutching engagement at a predetermined speed of the driving shaft, said screw-threaded clutch member being automatically disengaged from said driving clutch member when the speed of the driven shaft exceeds that of the driving shaft, and automatically engaging another part on the driving shaft when the speed of the latter is slightly accelerated during such disengagement.

12. In a clutch, a driving shaft, a clutch member carried thereby, a second clutch member carried by the driving shaft, a driven shaft, a clutch member screw-threaded thereon and located between the two clutch members carried by the driving shaft, automatic means forcing said first mentioned clutch member and said screw threaded clutch member into engagement at a predetermined speed of the driving shaft, said screw-threaded clutch member becoming disengaged therefrom when the speed of the driven shaft exceeds that of the driving shaft, and automatically engaging said second clutch member when the speed of the driving shaft is slightly accelerated during such disengagement.

13. In a clutch, a driven shaft, a nut screw-threaded thereon, a spiro-helical spring having one end anchored to said shaft and the other end anchored to said nut, said spring reacting between said nut and shaft, a stop on the shaft against which the nut is normally held by said spring, a clutch disk carried by said nut, a driving shaft, a clutch disk carried thereby and movable axially thereof, and automatic means forcing the disk carried by the driving shaft into driving engagement with the disk on the said nut at a predetermined speed of the driving shaft.

14. In a clutch, a driven shaft, a nut screw-threaded thereon, a spiro-helical spring having one end anchored to said shaft and the other end anchored to said nut, said spring reacting between said nut and shaft, a stop on the shaft against which the nut is normally held by the action of said spring, a clutch disk carried by said nut, a driving shaft, a clutch disk carried thereby movable axially thereof, automatic means forcing the disk carried by the driving shaft into driving engagement with the disk on the said nut at a predetermined speed of the driving shaft, said nut disengaging the disk thereon from the said driving shaft disk when the driven shaft overruns the driving shaft, whereby free-wheeling occurs, and a friction member carried by the driving shaft and engaging the disk on said nut when the driving shaft is slightly accelerated during such free-wheeling.

15. In a clutch, a motor-driven cup-shaped flywheel, a driven shaft taking bearing within and axially thereof, a cover secured to the rear side of said flywheel, a motor-driven clutch disk and a driven shaft clutch disk within the flywheel, means carried by the flywheel and automatically forcing said disks into clutching engagement at a predetermined speed of the flywheel, means carried by the driven shaft automatically disengaging said disks when the driven shaft overruns the flywheel, said last named means automatically bringing the driven shaft disk into clutching contact with said cover when said flywheel is slightly accelerated during said disengagement.

16. In a clutch, a driving shaft, a plurality of clutch members driven thereby, a driven shaft, a clutch member screw-threaded thereon and located between the two clutch members on the driving shaft, and means operable during free-wheeling and causing one of said driving shaft members to automatically check the revolution of said screw-threaded member, whereby said screw-threaded member is thrown into clutching engagement with other driving shaft member.

In testimony whereof I have signed this specification.

FENBY T. BROWN.